United States Patent
Bortolotti et al.

(10) Patent No.: US 10,178,743 B2
(45) Date of Patent: Jan. 8, 2019

(54) PORTABLE ELECTRIC LAMP WITH A SYSTEM OF WIRELESS COMMUNICATION

(71) Applicant: Zedel S.A., Crolles (FR)

(72) Inventors: Raphael Bortolotti, Annecy le Vieux (FR); Christophe Marie, Le Versoud (FR)

(73) Assignee: Zedel, Crolles (FR)

( * ) Notice: Subject to any disclaimer, the term of this patent is extended or adjusted under 35 U.S.C. 154(b) by 117 days.

(21) Appl. No.: 15/235,721

(22) Filed: Aug. 12, 2016

(65) Prior Publication Data

US 2016/0353560 A1 Dec. 1, 2016

Related U.S. Application Data

(63) Continuation of application No. PCT/EP2015/053134, filed on Feb. 13, 2015.

(30) Foreign Application Priority Data

Feb. 14, 2014 (FR) ..................... 14 00408

(51) Int. Cl.
*H05B 37/02* (2006.01)
*F21L 4/00* (2006.01)
(Continued)

(52) U.S. Cl.
CPC ............ *H05B 37/0272* (2013.01); *F21L 4/00* (2013.01); *F21V 14/003* (2013.01); *F21V 23/04* (2013.01);
(Continued)

(58) Field of Classification Search
None
See application file for complete search history.

(56) References Cited

U.S. PATENT DOCUMENTS

| 6,095,661 A * | 8/2000 | Lebens | ................. F21L 4/027 |
| | | | 315/224 |
| 7,410,271 B1 * | 8/2008 | Man | ....................... F21L 4/005 |
| | | | 362/184 |

(Continued)

FOREIGN PATENT DOCUMENTS

| CN | 101218469 | 7/2008 |
| CN | 103026793 | 4/2013 |

(Continued)

OTHER PUBLICATIONS

PCT Search Report, International Application No. PCT/EP2015/053134, Applicant: Zedel S. A. , dated Apr. 30, 2015, 13 pgs and English language translation, 12 pgs.

(Continued)

*Primary Examiner* — Crystal L Hammond
(74) *Attorney, Agent, or Firm* — Saile Ackerman LLC; Stephen B. Ackerman

(57) ABSTRACT

A portable lamp, such as a headlamp, comprising wireless bidirectional communication means for exchanging configuration instructions, parameters and/or data with at least one mobile information processing system. This mobile processing system establishes a downlink for the transmission of said configuration instructions, parameters and/or data to the lamp. The lamp can establish an uplink for the transmission of configuration instructions, parameters and/or data from the lamp to said mobile information processing system.

27 Claims, 8 Drawing Sheets

(51) Int. Cl.
*H04W 4/70* (2018.01)
*H04W 76/10* (2018.01)
*H04W 4/90* (2018.01)
*F21V 33/00* (2006.01)
*H05B 33/08* (2006.01)
*H04B 17/318* (2015.01)
*F21V 14/00* (2018.01)
*F21V 23/04* (2006.01)
*G08B 5/36* (2006.01)
*H04W 4/02* (2018.01)
*H04W 4/08* (2009.01)
*H04W 4/80* (2018.01)
*F21Y 115/10* (2016.01)
*H04W 84/12* (2009.01)
*H04W 84/18* (2009.01)

(52) U.S. Cl.
CPC ............ *F21V 33/0064* (2013.01); *G08B 5/36* (2013.01); *H04B 17/318* (2015.01); *H04W 4/023* (2013.01); *H04W 4/08* (2013.01); *H04W 4/70* (2018.02); *H04W 4/90* (2018.02); *H04W 76/10* (2018.02); *H05B 33/0854* (2013.01); *H05B 37/0218* (2013.01); *H05B 37/0227* (2013.01); *F21V 23/0435* (2013.01); *F21Y 2115/10* (2016.08); *H04W 4/80* (2018.02); *H04W 84/12* (2013.01); *H04W 84/18* (2013.01); *Y02B 20/46* (2013.01)

(56) References Cited

U.S. PATENT DOCUMENTS

| | | | | |
|---|---|---|---|---|
| 7,918,578 | B2 * | 4/2011 | Spartano | F21L 14/00 362/103 |
| 8,157,401 | B2 * | 4/2012 | Lau | F21L 4/08 362/105 |
| 8,405,489 | B1 * | 3/2013 | Halm | F21L 14/00 340/13.21 |
| 8,529,086 | B2 * | 9/2013 | Skrivan | F21V 23/0414 307/116 |
| 9,366,401 | B2 * | 6/2016 | Koyama | F21L 2/00 |
| 2003/0067769 | A1 | 4/2003 | Gilpin | |
| 2006/0056855 | A1 * | 3/2006 | Nakagawa | G09F 9/33 398/183 |
| 2008/0198280 | A1 | 8/2008 | Hikmet et al. | |
| 2008/0265799 | A1 * | 10/2008 | Sibert | H05B 37/0245 315/292 |
| 2011/0031901 | A1 * | 2/2011 | Huguenin | H05B 33/0851 315/307 |
| 2012/0020063 | A1 | 1/2012 | Mironichev et al. | |
| 2012/0026726 | A1 | 2/2012 | Recker et al. | |
| 2012/0206050 | A1 * | 8/2012 | Spero | B60Q 1/04 315/152 |
| 2013/0134906 | A1 | 5/2013 | Picareillo | |
| 2013/0214998 | A1 * | 8/2013 | Andes | G02B 27/017 345/8 |
| 2015/0151671 | A1 * | 6/2015 | Refior | H05B 33/0854 315/297 |
| 2016/0337564 | A1 * | 11/2016 | Fournier | F21V 14/003 |
| 2017/0080849 | A1 * | 3/2017 | Nogha Mbai | B60Q 1/1423 |

FOREIGN PATENT DOCUMENTS

| | | |
|---|---|---|
| EP | 2 345 864 | 7/2011 |
| EP | 2706824 | 3/2014 |
| FR | 2991545 | 12/2013 |
| WO | WO2009133309 | 11/2009 |
| WO | WO2015121433 | 8/2015 |

OTHER PUBLICATIONS

Chinese Office Action, Issue Serial No. 2018032001655090, Applicant: Zedel S. A., dated Mar. 23, 2018, 12 pgs., and English language translation, 15 pgs.

* cited by examiner

PORTABLE ELECTRIC LAMP WITH A SYSTEM OF WIRELESS COMMUNICATION

This is a continuation of PCT application serial number PCT/EP2015/053134, filed on Feb. 13, 2015, which is herein incorporated by reference in its entirety, and assigned to a common assignee.

TECHNICAL FIELD

The present invention relates to the field of portable electric lamps, and in particular, a portable electric lamp with a wireless communication system.

BACKGROUND

The Applicant of the present application has marketed a portable lamp, of the type headlamp fitted with a "reactive" or "dynamic" lighting that is described in the patent application WO2009/133309 dated Apr. 16, 2009. Briefly, as illustrated in FIG. 1, there is a headlamp having at least one light emitting diode LED 11 together with an optical sensor 14 mounted in its vicinity and for sensing a signal representative of the light reflected by the surface of an object 16 illuminated by the lamp. A control circuit 13 provides a processing of this signal in order to automatically regulate the power of the LED according to a predetermined threshold. In this manner, automatic control of the light beam emitted by the lamp is carried out without further manual action to adjust the lighting in the environment, while adjusting the power consumption.

The principle of the lighting called "reactive" or "dynamic" is undeniably a significant advance in the field of headlamps, and more generally of the portable lighting, particularly in that it adapts the illumination constantly to the lighting conditions. However it appears that the integration of signal processing and processors within headlamps is rapidly increasing both the manufacturing costs so that their weight and bulk.

There is thus a problem to allow the integration of additional and innovative functions—requiring significant computational resources—into headlamps without significantly increasing the manufacturing cost, weight and/or size of these lamps.

The Applicant of the present application also filed the European patent application EP13368029.8 dated Sep. 10, 2013 (Publication EP2706824) in which a headlamp is equipped with data communication means, of the infrared type (IR), in order to detect the occurrence of a second lamp IR also fitted with means of communication, said communication allowing the adjustment of respect lighting levels to avoid mutual glare.

SUMMARY

It is an object of the present invention to provide a new architecture for a portable lamp, particularly a headlamp, which allows the integration of new functionalities without requiring a significant increase regarding the manufacturing cost, the computing power or the size of the lamp.

It is another object of the present invention allow for effective and efficient communication between a portable lamp and a mobile data processing device, being external to the portable lamp, so as to improve the regulation of the light power or for achieving new functionalities.

It is a third object of the present application to provide an architecture for a portable lamp that can enable use in a fleet of lamps, with the aim in particular of increasing the autonomy of all portable lamps composing this fleet.

It is a fourth object of the present invention to provide a portable lamp with a sophisticated control of both the light generated by the lamp and the particularly geometry of the emitted beam.

It is a fifth object of the present invention to achieve a portable lamp, such as a headlamp, which provides new safety facilities, and particularly an alert function allowing one user to generate a signal for other users within a same group of communicating lamps.

It is a sixth object of the present invention to provide a portable lamp fitted with a new facility for quickly informing the user of the lamp when the latter wanders over a predetermined path or takes a wrong direction.

These and other objects are achieved by the embodiments of the present invention providing a portable lamp comprising first wireless bi-directional communication means for exchanging commands, parameters and/or configuration data with at least one mobile information handling system, comprising:
- means for establishing a downlink for transmitting said commands, parameters and/or configuration data to the lamp;
- means for establishing an uplink for the transmission of commands, parameters and/or configuration data from the lamp to said mobile processing system information.

In this way the portable lamp can communicate with a mobile information handling system, such as a mobile phone in order to take advantage of the significant data processing resources available within said mobile phone.

In a particular embodiment, the lamp further includes additional bidirectional communication means for communicating with at least one other lamp, thus giving the possibility of establishment of a real ad hoc network in which each lamp in the associated mobile system receive an identifier. Specifically the ad hoc network uses group addresses for simultaneously addressing several lamps and/or mobile systems belonging to a same group and the uplink and/or downlink transmissions may be for all devices of the same group.

Preferably, the portable lamp comprises means for detecting the level of charge of the battery, said level of charge being transmitted via the uplink to the mobile device.

In a particular embodiment, the lamp comprises a light sensor operating in the visible and/or infrared, for generating a brightness information which is transmitted via the uplink to the mobile device.

Preferably, the uplink is used to transmit a power information and/or information representative of the geometry of the beam.

In a specific embodiment, the portable lamp comprises means for controlling the brightness of the lamp, controlled by a first information received from the mobile device via the downlink. More specifically, a second information received from the mobile device is used for adjusting the geometry of the light beam.

Preferably the lamp comprises control means for controlling the geometry of the light beam, based on a diffusion device being electrically controllable, such as a Diffusion Polymer Liquid Cristal (DPLC) film.

Preferably, the first two-way communication is based on Bluetooth or WiFi communication, and portable lamp is a headlamp with one or more LEDs.

The invention also provides a method for controlling the operation of a portable lamp, said method comprising the steps of:

establishing a wireless bidirectional communication between the lamp and a mobile information handling system, comprising a downlink transmission from the information handling system to the lamp and uplink transmission link from the lamp to the mobile information handling system;

said downlink transmission being used for the transmission of said commands and/or configuration data to the lamp; and said uplink transmission being used for transmitting lamp operating parameters from the lamp to the information handling system.

More specifically the method comprises the steps of:
detection of the level of charging of the lamp battery;
transmission of the level of charging to the mobile information handling system.

In a specific embodiment, the method comprises the steps of:
detecting the brightness of the light beam generated by the lamp by means of a photosensor;
transmitting to the mobile system an information representative of said brightness detected by said photosensor.

More specifically, both the brightness of the lamp and the geometry of the light beam are respectively controlled by a first and a second information received from said mobile device via the downlink.

In a specific embodiment, the bidirectional communication means are organized according to an ad hoc network in which each lamp and the mobile information handling system receive an identifier, the ad hoc network using group addresses for addressing several lamps simultaneously belonging to the same group.

Preferably, the method uses the level of charge of the battery transmitted by the lamp to the mobile device, for the purpose of generating said first information which is being computed so as to ensure a predefined battery life.

In a particular embodiment, the method is such that the mobile device receives an information representative of the level of charging from each lamp belonging to a group of lamps, and generates said first information for each lamp of said group so as to guarantee a predefined battery life for the whole group.

In a particular embodiment, the method detects a situation of emergency and an emergency signal is transmitted via the downlink by the mobile device to the lamp so as to generate a light alarm signal. More specifically, the situation of emergency. In one particular embodiment, the mobile device uses GPS information for the purpose of producing the emergency signal which is transmitted to the lamp via the downlink so as to draw the user's attention on the emergency situation, for instance the presence of a bifurcation or the fact that the user departs from predetermined path.

The invention also permits the realization of a computer program, such as a application, comprising program code to be stored in the mobile device and intended for the implementation of the methods defined above.

Finally, the invention allows the realization of a mobile information handling system which is specially configured and adapted for the installation of an application or a software for the implementation of the method steps described above.

BRIEF DESCRIPTION OF THE DRAWINGS

Other features of one or more embodiments of the invention will appear from the following description of embodiments of the invention, with reference being made to the accompanying drawings.

DESCRIPTION

The inventors of the present application have recognized firstly that such processors or means of digital signal processing are increasingly present in the immediate vicinity of the lamp, whether integrated in portable telephones, also called "smartphones" or tablets that can encompass under the term of mobile Information handling systems.

Based on this observation, the inventors have designed a system which allows the integration of processing resources or processors within a headlamp by giving it bi-directional wireless communication means which therefore permits calculations tasks to be relocated within the mobile information processing system. Processor inputs and outputs are communicated through the wireless bi-directional communication.

The joint cooperation between the headlamp and the mobile device greatly increases the possibility of controlling the lamp and even provides new features as will be apparent hereafter, while maintaining at a reasonable level the manufacturing costs of such a lamp since the power computation resources are not located within the headlamp.

In all the embodiments which will be described below, one speaks of uplink communication when the headlamp is the emitter of commands, data and configuration parameters which are transmitted to the mobile information handling system.

Conversely, one will consider a downlink communication when the mobile information handling system generates information to be received by the headlamp.

Respectively on both uplink and downlink communications, one will consider more specifically one or more data channels and one or more control channels which may be advantageously transmitted via a single uplink or downlink communication. Thus, for example an optical sensor (such as a photodiode type phototransistor, CCD or other) and/or an image sensor (such as an infrared sensor of the type Passive Infra-red sensor, analog camera with its optical system or any other) that will be housed within the lamp can be used for transmitting data to the mobile information handling system, and particularly images via a data channel of the uplink communication, while commands or requests—for example for controlling the brightness of the light—can be transmitted via a control channel in the downlink. But this is only one example among many other possibilities.

Figure 1:
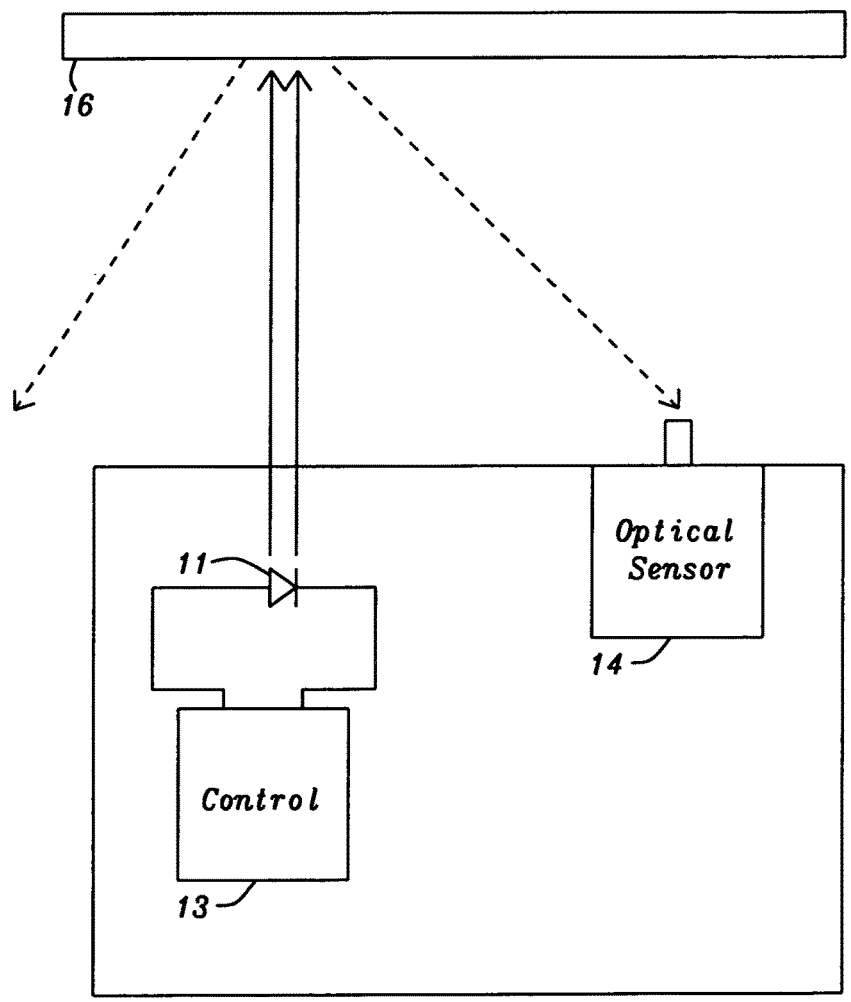
FIG. 1 illustrates the principle of the so-called "dynamic" or "reactive" lighting known in the prior art.
Figure 2:
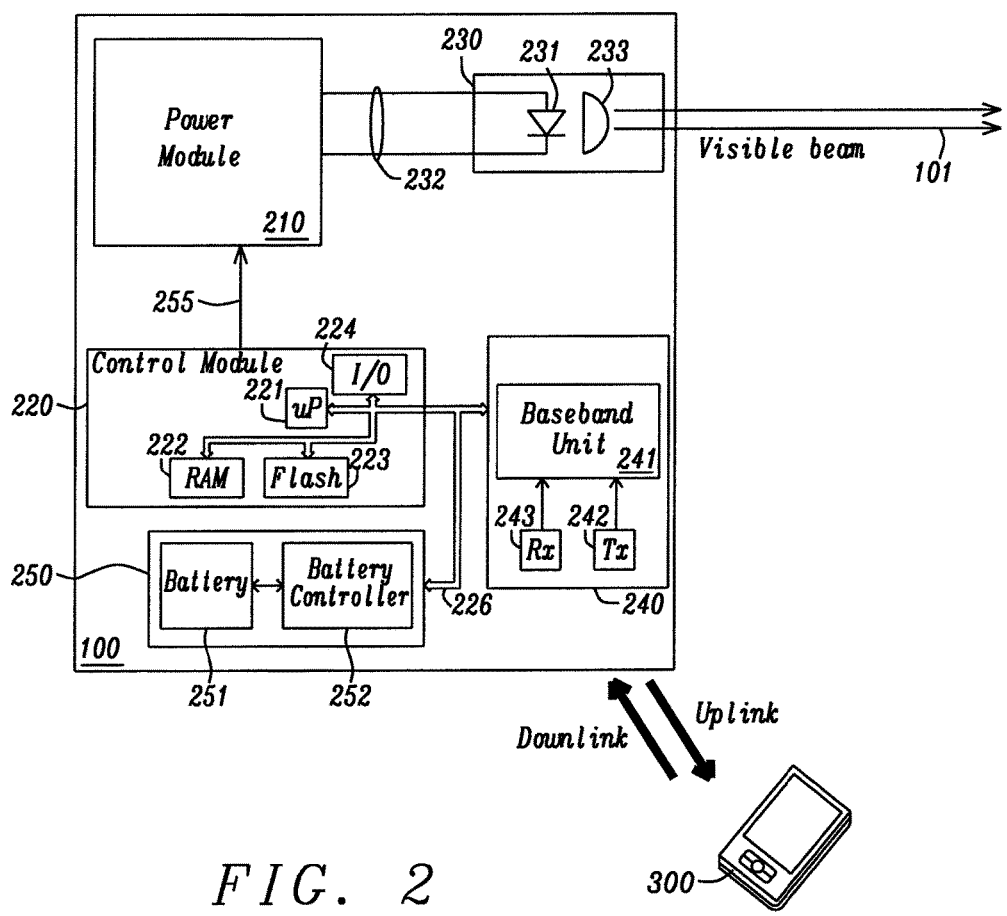
FIG. 2 illustrates a first embodiment of the present invention which allows to relocate within a mobile device the generating of a command which is transmitted to the lamp via the downlink communication for the purpose of controlling the brightness of light generated by the lamp.

Thanks to such arrangement, new facilities will be provided, as will appear with the description of four embodiments which follows:

1) a first embodiment wherein the control function of the brightness of the beam generated by the lamp is relocated within the mobile device;

2) a second embodiment wherein two parameters of the light beam are related within the mobile device: the brightness and the diffusion angle of the beam;

3) a third embodiment wherein both uplink and downlink communications are used in combination with the so-called "reactive" or "dynamic" lighting 4) a fourth embodiment wherein the lamp is communicating not only with its associated mobile device, but also with other portable lights 1) First Embodiment: The Use of the Downlink Channel for Controlling the Power of the Light FIG. 2 illustrates the general architecture of a first embodiment of a lamp 100—supposed to be a headlamp—fitted with a system for adjusting the light intensity. The lamp 100 includes a power module 210 associated with a control module 220 and a lighting unit 230 having at least one light emitting diode LED and a transceiver module 240 coupled the control module and a battery module 250 also coupled to the control module.

In the example of FIG. 2, the lighting unit 230 comprises a single LED 231 fitted with its supply circuit 232 which is connected to the power module 210. Clearly, more diodes may be considered for obtaining a higher brightness beam. Generally speaking, the LED (s) may be associated (s) to a proper focal optical system 233 to ensure appropriate collimation of the light beam generated by the LED(s).

In a specific embodiment, the current which is supplied to the LED diode 231 via circuit 232 is supplied the power module in accordance with a control information or a control signal generated by the control module 220 via a circuit which can take the form of a lead/wire or set of wires constituting a bus. Figure particularly shows an example of a conductor 225.

The power module 210 specifically includes all components that are conventionally found in an LED lighting lamp for producing a light beam of high intensity, and in general based on Pulse Width Modulation (PWM), well known to the skilled man and similar to that known and used in class D audio circuits. The PWM modulation is controlled by control signal 225 generated by control module 220. Generally speaking, the term "signal" mentioned above refers to an electrical quantity—current or voltage—that can cause control of the power module and in particular the PWM modulation for supplying current diode LED 231. This is only one particular embodiment, with the understanding that it will be possible to substitute to "control signal 225" any "control information" such a logical information stored in a register and transmitted by any suitable means to power module 210 in order to control the transmission power of the light beam. The control signal may be transmitted on different carriers depending on whether an electrical signal or an information. These carriers may be a bus type communication line for coupling the control module and the power module or a simple electronic circuit for transferring a control voltage or a control current. In one particular embodiment, we can even consider the two control and power modules be integrated within a same module or integrated circuit.

A skilled man will therefore readily understand that when we refer to a "control signal 225", one indiscriminately encompasses embodiments using an electrical quantity control—current or voltage—and the embodiments in which the command is performed by means of a logic information transmitted within the power circuit. For this reason, one will hereinafter indiscriminately use the wordings "control signal" or "control information".

In general, switches and switching components that constitute power module 210—are well known to a skilled man and the presentation will be deliberately reduced in this regard for the sake of brevity. Similarly, the reader is invited to refer to the general literature on various aspects of the PWM modulation (PWM).

Referring back to FIG. 2, it can be seen that the control module 220 includes a processor 221 and RAM type volatile memory 222 as well as non-volatile memory (flash, EEPROM) 223 and one or more input/output circuits 224.

Moreover, the headlamp further includes transceiver module 240 that provides wireless bidirectional communication with the mobile information handling system 300. In a preferred embodiment, the transmitter and the receiver will be compatible with the Bluetooth standard, preferably with the low-energy Bluetooth 4.0 standard. In another embodiment, one may rather consider the use of the WIFI or IEEE802.11 standard. One may even consider the use of these two standards for simultaneously establishing a master-slave Bluetooth communication between the lamp and the mobile device 300, together with a further communication within an ad-hoc network comprising a group of lamps and their associated mobile information handling system. The transceiver module 240 includes a baseband unit 241 which is coupled to a receiver 243 and a transmitter 242.

Finally, the headlamp comprises a battery module 250 comprising a battery 251 and a battery controller 252.

Generally speaking, control module 220 may access to each of the other modules in the lamp, and in particular to the power module 210, the transceiver module 240 and the battery pack 250. This access may take various forms, either by means of circuits and/or specific leads or set of leads forming a bus. As an illustration, the lead 225 is shown in FIG. 2 as a driver while a true bus 226 is used for exchanging data/address and control information between control module 220, battery module 250 and transceiver module 240.

This is, however, only one possible particular embodiment, and it is clear that a skilled man may consider various modifications and/or adjustments which may be required for one particular design.

By accessing the different modules composing the headlamp, control module 220 can both read and collect information stored within each of those modules and/or vice versa, load information, data and/or commands, as will be seen in detail in the following discussion.

Thus, control module 220 may send a command signal to power module as represented by the signal transmitted on wire 225 and, more generally, can read the current value of the current being supplied to the LED diode 231 through supply circuits 232 (via the circuits and/or bus not shown in the figure). Similarly, control module 220 may access the battery module 250 via bus 226 to read either the different voltage values present at the battery terminals (according to the cycle charging or discharging current) and/or the value of the current being provided so as to calculate the level of charging (State of Charge).

Different methods are known in the prior art for computing the State of Charge on the basis of different measurements, some requiring a storage of measurement data in nonvolatile flash memory 223 for the purpose of averaging or integrating those measurements. These methods, well known in the art, are applied by processor 221 in accordance with specific and appropriate algorithms to determine the state of charge remaining in the battery.

In accordance with the embodiment shown in FIG. 2, receiver 243 and transmitter 242, composing transceiver module 240, respectively handle the signal received via the uplink from the mobile device 300 and the signal to transmit via the downlink. Baseband unit 241 processes the information packets to the lamp or its mobile information handling system 300. To achieve this, baseband unit 241 may be required to perform various treatments, in series or in parallel, of the digital representation of the signal received by the receiver 243 and to be transmitted by transmitter 242, in particular, filtering operations, statistical calculation, demodulation, encoding/decoding channel for the purpose of establishing a robust communication channel, insensitive to the noise etc. Such operations are well known in the field of signal processing, especially when it comes to isolate a particular component of a signal, likely to digital information, and it will not be necessary here to burden the presentation of the description.

Once detected, these packets are transferred to the processor 221 within the control module 220.

The processor 221 is responsible for the interpretation of the received packets and also for the formatting of packets to be transmitted in accordance with a specific format or standard to be considered. Thus in the case of Bluetooth Low Energy standard, these packets have a structure complying with the Generic Attribute Profile (GATT) Standard which does not require further description here. Depending on the interpretation of the data bits included in the received packets, the processor will reconstruct any information or commands received on the downlink from the information processing system of mobile device 300. Having interpreted this information or commands, processor 221 will then relay or convert this information or command to the particular module being concerned. Thus in this first embodiment, processor 221 identifies within the received packets the commands to the attention of the power module 210 for the purpose of adjusting the light intensity and in response to this identification is likely to generate control information on lead 225 to the destination of power module 210 for the purpose of modifying the brightness of the light generated by the lighting unit 230.

In addition, the processor 221 can also identify read requests issued by the associated information handling system of mobile device 300, so that the headlamp may transmits to the latter certain parameters on the uplink.

These requests can thus be a request for a State of Charge of the battery of a request regarding the current level of brightness of the light output. In this case, processor 221 performs a read operation of the appropriate data/information directly stored within the appropriate module concerned by such information and then proceeds to additional processing steps on that information so as to derive a final information (e.g. the Stage of Charge) which is then formatted within a corresponding data packet to be transmitted by transceiver module 240.

As is well known to the art and applied in a number of telecommunications standards, communication between the lamp and the mobile information processing system can be done in the context of acquittals or non-acknowledgments sent in response to each packets being correctly or incorrectly received during the transmission, and designated under the name of Automatic Repeat reQuest (ARQ). This ARQ mode thus ensure good reception of data packets in both directions and thus prevents undesired communication breakdown.

Clearly, FIG. 2 describes a basic embodiment, and that many other embodiments are possible for a skilled person. For example, in a more sophisticated embodiment, the headlamp can includes some additional modules which will also be coupled to processor 221 via bus 226 for example. These modules can then also exchange uplink or downlink data or commands with the information handling system of the associated mobile device 300.

Thus, the data/control channels used in both the uplink and downlink may advantageously serve to convey data/control information and commands concerning a possible control device "electric zoom" (as more specifically it will be seen with the second embodiment described below) but also a light sensor, an image sensor, a speaker/microphone module, another power module for auxiliary LEDs which can also be integrated into the power module 210 existing etc.

The headlamp is thus configured to provide a bi-directional communication with a information handling system included into mobile device 300, for example a mobile phone or a smartphone. This mobile information processing system 300 further comprises, as it can be seen in FIG. 3, mutual communication means comprising a transmitter 330 and a receiver 320 respectively for the downlink and the uplink, a central processor 310 and a dedicated application 350 stored in memory (not shown) and for the exchange of information with the headlamp, including the control of the latter using CPU time of said processor 310.

Figure 3:
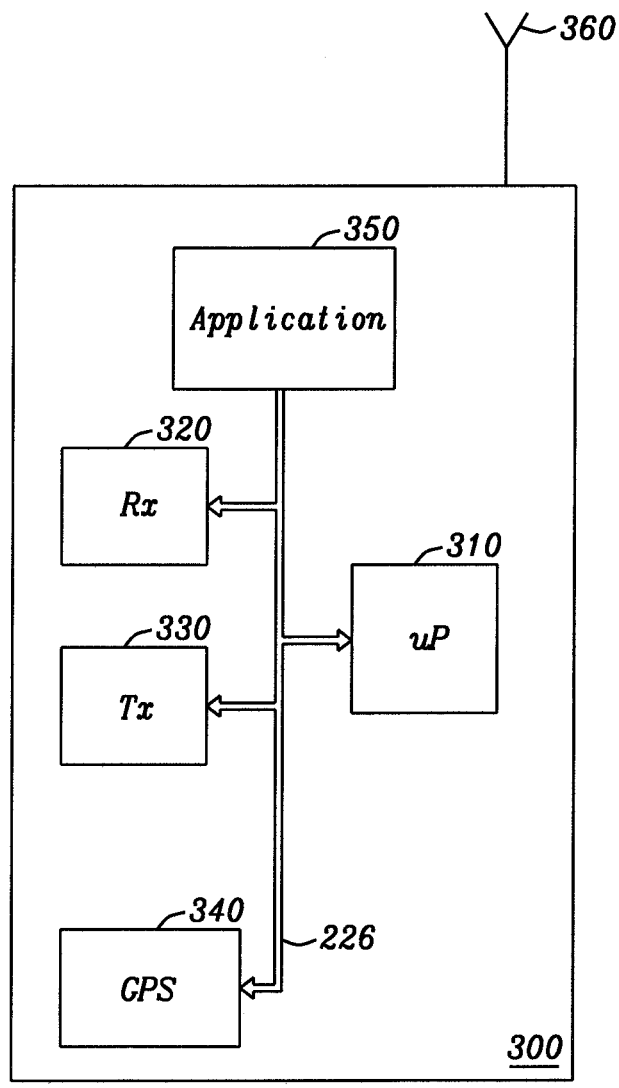
FIG. 3 illustrates an architecture of a mobile information handling device 300 used in the first embodiment.

The central processor 301 of the mobile device 300 is in connection with the multiple modules on the latter, such as a GPS 340 illustrated in FIG. 3. The dedicated application 350 which is being started on the mobile device 300 serves for coordinating the various functionalities and exchanges of communication with the headlamp 100 while providing a friendly user interface by means of which the latter may either enter operating parameters and even directly control the operating of the headlamp or select various options regarding its functionalities.

The application 350 may thus, through this bi-directional communication channel between headlamp 100 and device 300, access all the lamp settings and, conversely, adjust and control most of the functionalities of the latter.

In the embodiment which was described above, application 350 can be advantageously used for controlling the brightness of the light output by the lamp, from a minimum value corresponding practically to the power off of the lamp, up to a maximum value corresponding to the maximum light power allowed by the latter.

Alternatively, there is provided in this first embodiment an additional switch, not shown in FIG. 2, configured under a conventional form such as a ring to be rotating at the lamp or any other conventional switch. Thanks to such additional switch, the user is given the possibility to directly control the switching on or the switching off of the lamp, regardless of any exchange of communication with the mobile device

300. Therefore, in the absence of such communication, the lamp behaves in the quite conventional "autonomous" mode.

But this certainly does not exclude the possibility to further add a more sophisticated control mode involving more actively mobile device 300. Indeed, in one embodiment, as soon as the lamp 100 is switched on, processor 221 is configured to initialize transceiver module 240 in order to connect with mobile information handling system 300, to achieve more sophisticated operating modes for the implementation of a more efficient regulation or bringing new capabilities.

The so-called "autonomous" mode will be restored as soon as a break in connection with the mobile device 300 occurs, or deliberately at the initiative of the lamp user, either at a loss of connection between the lamp and its associated mobile device.

Thus, the lamp 100 can respond independently to an operating mode designated as "Manual", under the sole control of the control button (and/or other internal or internal switch control device), or remotely based on the two downlink and uplink communications.

In a preferred embodiment, the lamp is equipped with a manual switch controlling the extinction of the communication module 240, and causing the autonomous operation of the lamp.

Finally, for the sake of reducing power consumption, it might be useful to minimize the transmission operations of the headlamp. So the lamp may be configured in a mode where information is transmitted via the uplink only in response to a request received from the mobile device 300, or when a critical value is exceeded under surveillance, such as, for example, the fall of the State of Charge of the battery below a predetermined threshold, or a level of measurement of the brightness being less than another predetermined threshold.

As shown, the first embodiment takes advantage of the computing resources which are available in the mobile device 300, and offers the possibility of multiple new functionalities.

To this end, and for the sake of illustration of the many new possibilities, we now describe a first scenario in which the computing power of the mobile device 300, together with its associated communication functionalities (database access, GPS etc). are used for controlling the parameters of the light beam generated by the headlamp and specifically the power delivered by the LED which is a function of the supply current flowing via the lead 232.

First Scenario of Use

In this first scenario, the lamp 100 receives in the downlink power commands from the associated mobile device 300, and conversely, transmits the uplink information representative of the state of charge of the battery 251.

In a particular embodiment, this information will be periodically transmitted by the lamp 100 (including the CPU 221) to the device 300. Alternatively, this information will be transmitted in response to a specific request from the device 300 received via the downlink.

This is clearly only one—non limiting—example of requests may be transmitted by the device 300.

Other requests may be further considered, including a request serving for obtaining any parameter relevant to any operation of the lamp, such as for example the current light brightness, the supply current of the LED 231, or any data generated by any specific sensor housed within the headlamp, such as optical sensors (photodiode, phototransistor, CCD or the like), an image sensor (infrared sensor type Passive infra-red sensor, analog camera with its optical system or other) or various other sensors (accelerometers etc.).

All those parameters mentioned above, and many others, may well be usefully transferred to the mobile information handling system 300 via the uplink to be properly treated, especially within a sophisticated control loop taking advantage of the great power calculating available in the mobile device 300, eventually leading to an adjusting control command which is fed back to the headlamp via the downlink communication.

We can also combine these two specific modes by arranging a periodic transmission of significant parameters of the lamp operation (power, diffusion angle, State of charge of the battery etc.) or in response to specific requests from the device 300, or even the occurrence of a predetermined specific situation is detected (battery charge below a threshold etc.).

To illustrate the flexibility of the proposed solution and the multitude of new possibilities and functionalities offered to the user of the headlamp, one will now describe how an exchange of data and instructions can be used to develop a new functionality to guarantee a given lifetime of the battery. More specifically, the lamp is being configured to provide light at least for a specific time or value of autonomy.

This precise time of battery life is a value that the user has previously defined in appropriate settings on a dedicated application 350 running in the mobile telephone 300 (in the present embodiment) in FIG. 3. Thus the application 350 allows the user to enter a desired battery lifetime as a predetermined setting, such as the estimated duration of a trip in hours or minutes or more simply a value directly extracted from a personal library of the user. In another embodiment, the application 350 may calculate the lifetime value on the basis of GPS data considered together with the description of the entire trip to consider, and the speed of progression and may continuously adjust this value in accordance with the user's progression in the trip. Alternatively, this parameter value may be directly calculated from an information stored on a remote server and downloaded by the application 350. From all the information which is available within the mobile information handling system 300, which information may be subject of a proper processing using sophisticated and complex algorithms with the computing power available within the device 300, the application 350 can then calculate the time of autonomy required for performing the particular trip being considered based on this characteristics of the trip, and the profile of the user (average speed, shape, statistical data related to previous excursions etc.) and possibly other factors such as time, weather, lunar position (moon phase, sunrise and sunset) and/or the ambient brightness. This battery lifetime which is computed can be continuously adjusted by the application taking into account the same factors also adjusted as well as the position of the user on this trip and the average velocity of the user among others. Such value of the battery lifetime shall be designated $T_{aut}$—(autonomy time)

Once this value of the autonomy time $T_{aut}$ is computed, the application 350 running in the mobile phone 300 then performs further computations or estimates of other operating parameters of the lamp 100, first the current state of charge battery, which will be denoted $C_{remaining}$ (t) and possibly other factors such as time, weather, location lunar (moon phase, sunrise and sunset) and/or the ambient light (the ambient light can be obtained via the brightness sensor of the embodiment).

Once all parameters are known or estimated, the application is able to calculate or estimate possible correction to continuously bring to operating parameters of the headlamp 100, and in particular regarding the brightness of the light beam emitted or the level of the current supplied to the LED 231. Application 350 may also be used to calculate an average value of power noted Pm supplied by the power module, according to these data, and periodically transmits the average value to the headlamp, which will then comply with this value Pm while guaranteeing a given lifetime.

In general, the dedicated application 350 may implement various algorithms—simple or sophisticated—for precisely adjusting the operating parameters (power, light diffusion) of the lamp 100.

It is clear that multiple algorithms, more or less sophisticated, can be designed to ensure a given lifetime of the headlamp, or getting as close as possible, which will depend on the computing power made available in the mobile phone 300, or the quality and quantity of additional information available to the application 450.

The most basic of them is to get depending on the State of Charge remaining $C_{remaining}$ (t) and the remaining battery time to provide ($T_{aut}$–1), the average power delivered by the power module to follow Pm. "t" is the time already elapsed. The state of charge can be considered as remaining power, there is a relation of the type: $P_m = a^{*k}\sqrt{(C_{remaining}(t)/(T_{aut}-t))}$ for a lead battery, where a is a variable taking account of the ratio of energy used by the lamp for the single lighting function and which will be optimized so as to be close to 1, and k is known as the Peukert constant reflecting the non-linearity of the capacitance as a function of the current or power being supplied. Due to other modules on the lamp, "a" will be less than 1. A skilled person could clearly adapt the formula to a Li-Ion battery.

This calculated value Pm is directly associated by the dedicated application 350 to a corresponding control signal which is then transmitted to the lamp by the transmitter 330.

In the described embodiment, the control signal transmitted via the downlink channel is, upon receipt by the lamp 100, detected and applied directly to the power module 210 via the control signal 225, which can thus adjust the light output of the headlamp.

But the computing power of the mobile device 300 can be used not only to come to adjust the brightness of the light beam, but also any other parameters as we see it now with the second embodiment wherein the regulation processing relocated within device 300 encompasses not only the brightness control but also the control of geometry of the light beam, opening the way for a true relocation, outside the lamp, of the control of the different characteristics of the light beam generated by the lamp.

Figure 4:
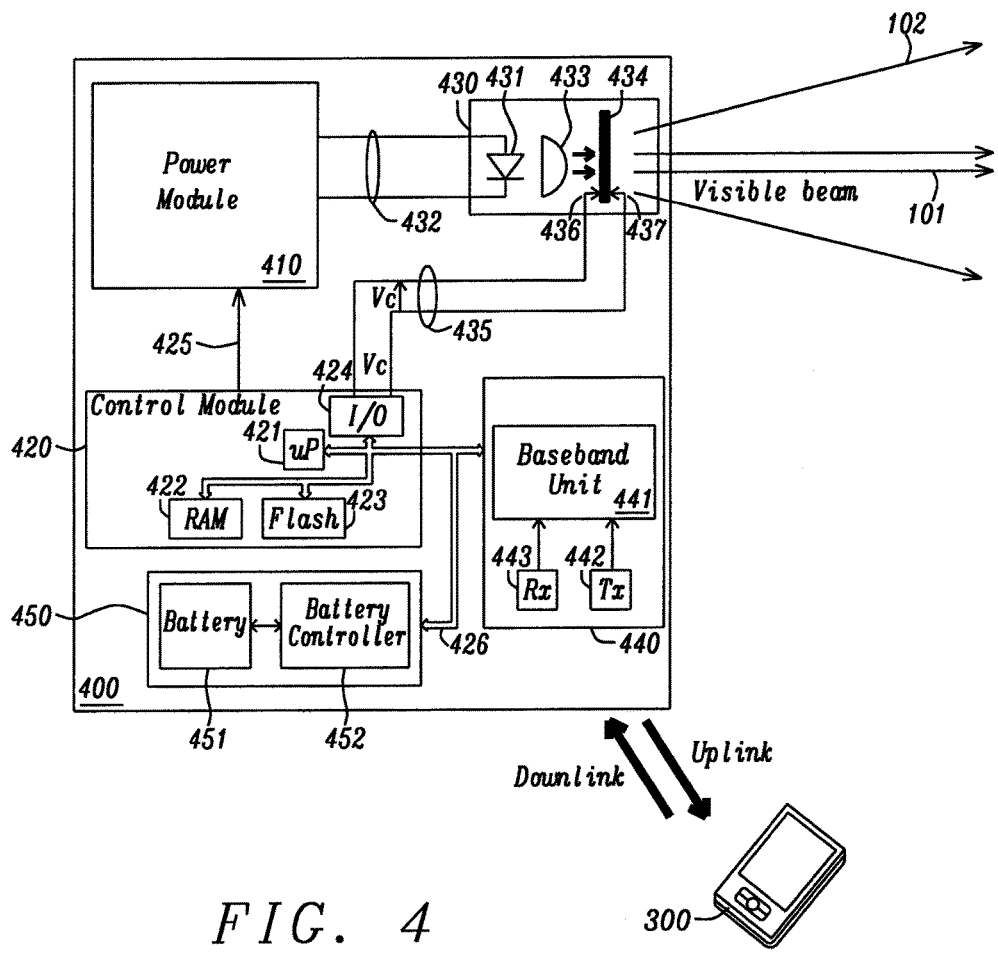
FIG. 4 illustrates a second embodiment of the present invention for controlling, via the downlink communication, the power of the beam and the angle of diffusion of the light beam generated by the lamp.

2) Second Embodiment: Control the Power and the Diffusion Angle Via the Downlink FIG. 4 illustrates a second more sophisticated embodiment of a headlamp 400 in which the computing resources provided by the mobile device are used not only to adjust the brightness of the LED, but also the geometry of beam of that beam.

The lamp 400 comprises again a power module 410—similar to module 210 described above—for supplying power to a lighting module 430 under the control of a control module 420, which control module 420 has an access to a battery pack 450 (similar the module 250 described above) as well as to a transceiver module 440 (similar to the module 240 described above).

As before, the lighting unit 430 has a single LED 433 receiving current through its circuit 432 connected to the power module 410. In this second embodiment, clearly, several LEDs can be also considered for obtaining a high brightness beam. Or the LED (s) may be associated with an appropriate optics system 433 to ensure collimation of the light beam generated by the LED, in particular so as to produce a luminous flux which, in this second embodiment, will be particularly narrow before passing through a beam geometry control device 434 for adjusting the angle of diffusion of the light beam so as to generate a "zoom" "zoom" useful to the lamp holder.

Preferably, the device 434 providing control of the geometry of the light beam is an electro-optic device based on a layer or a Diffusion Polymer Liquid Cristal (DPLC) film (liquid crystals dispersed in polymer) which consists of the implementation of dispersion liquid crystal heterogeneous within a polymer matrix. DPLC film 434 can advantageously replace the protective glass usually arranged in front of the LEDs, and includes two electrodes 436 and 437 for receiving a bias potential Vc transmitted by a set of leads 435.

As stated above, optics 433 is controlled to generate a particularly narrow collimated beam, so that the combination of this optical 434 with the diffusion control electro-optic device 434 makes it possible to produce, by means a single LED, a large configuration of beams having different geometries. One can thus produce a first long narrow beam (with an angle less than 10°) shown in FIG. 4 by the reference numeral 101 or opposite to a short and wide beam 102 having a greater diffusion angle (30 or 50 degrees).

And all intermediate values are possible from simply adjusting a control potential Vc to the appropriate value.

Thanks to this particularly advantageous arrangement, one can achieve a portable lamp providing great versatility, since it becomes possible to simultaneously control not only the brightness of the light, but also various configurations of beams which may serve in different configurations (ambiance light-lantern-dawn simulator alarm).

Preferably, the powering of the LED diode 431 via circuit 432 is performed by the power module 410 under control of a control information or a control signal 425 that is generated, similarly to the first embodiment, by control module 420.

The power module 410 includes components which are similar to those described above, with respect to module 210 so that it will not be necessary to develop more the description. It suffices to recall that one may refer equally to a control signal or control information to specify how control module 420 controls the power module generating the current supplied to the LED 431.

However, in this second embodiment, control module 420 is also configured to generate a second control signal or a second control information intended to adjust the diffusion coefficient of the visible beam generated by the lamp. To achieve this, the control module comprises, as previously in the first embodiment, a processor 421 coupled to volatile memory 422 (RAM) and non-nonvolatile (flash, EEPROM) 423 and one or more input/output circuits 424 which can now server, in this specific embodiment, to generate the control voltage Vc useful for controlling the beam diffusion angle via DPLC film 234.

For the sake of simplicity, one has shown, in diagram of FIG. 4, the generation of Vc control voltage via the input output circuit I/O 424, under control of the processor 421. In practice, a skilled man has to be aware that it is required to produce a voltage having a relatively high value (several tens of volts), which may require the use of a specific controller to generate such high-voltages, which controller will be composed of suitable electronic circuits (the "boost" type of converters) controlled via the input/output circuit 424 used for reading and writing digital information representative of the analog voltage Vc to generate. Such adaptations are clearly within the understanding of a skilled person, who will be able to adapt the scheme of FIG. 4 in accordance with any particularly requirement.

Portable lamp 400 further includes a transceiver module 440 having a base band unit 441 communicating with a transmitting unit Tx 442 and a receiving unit Rx 443 respectively for implementing the uplink and downlink communication channels with mobile device 300. As before, transmitter 442 and receiver 443 will be compatible with the Bluetooth standard, preferably with the standard Bluetooth 4.0 low energy or, alternatively, with the WiFi standard IEEE802.1 or 1.

Finally, as in the first embodiment, the headlamp 400 includes a battery module 450, further comprising a battery 451 and its battery controller 452.

Again, in this second embodiment, control module 420 can access each of the other modules comprised within the lamp, including the power module 410, the transceiver module 440 and the battery module 450. With this access, the processor 420 may communicate on the uplink and downlink channels any useful parameter, including the information representative of the lamp output power but also information relating to the angle of diffusion to be applied by the diffusion optical electro-device 434.

Thus, in the direction of the uplink communication, control module 420 may transmit to the device 300 and its application 350 any information relative to the brightness of the lamp and the geometry of the beam. This information can then be properly processed by mobile device 300 thanks to the huge processing resources available within device 300, which can then adjust, periodically or in real time, the brightness of the lamp and the diffusion angle to be used.

The exchange of information between headlamp 400 and mobile device 300 data processing may take place either periodically at the initiative of the lamp or in response to requests generated by the device 300.

The application 350 thus, through this bi-directional communication channel established the headlamp 400 and the mobile device 300, can access all the lamp settings and, conversely, can adjust and control most of the parameters used for operating the latter, not only the power of the light generated by the lamp but also the angle of diffusion to be applied to the light beam.

This control of the lamp operating parameters can be implemented by extending, if necessary, the scenarios described in connection with the first embodiment above, to enable the application 350 to calculate the overall operating parameters lamp including the power and angle of diffusion from various information available to the application (state of charge of the battery, duration of trip, profile, GPS data, current time, weather data etc. . . . )

And as for the first embodiment, this bi-directional communication channel can be deactivated as needed to allow the autonomous mode of operation of the lamp. The second embodiment described above shows that the architecture proposed by the inventors may serve not only for setting one operating parameter of the headlamp, but further, to control various parameters and thus the entire operating of the headlamp.

This shows the great advantage provided by the relocation of the loop control of the lamp inside the external mobile device 300, for example the mobile phone of the lamp holder, in order to take advantage of the full processing resources which are available in the latter, as well as the rich information which may be stored and downloaded into that mobile device.

But this by no means exhausts the possibilities provided by the present invention, and one will now see, with a third embodiment, the advantages which may be obtained by combining the solution proposed with the lighting called "dynamic" or "reactive" developed by the applicant and working internally to the lamp).

3) Third Embodiment: Integration with the "Dynamic" or "Reactive" Lighting

One will now consider, with this third embodiment, the combination of two control loops for controlling the brightness of the light and the geometry of the light beam, namely a first internal regulation loop which operates according to the conventional so-called "reactive" or "dynamic" lighting as developed by the Applicant, and a second external control loop operating according to the principles described above and further involving the computing resources of mobile phone 300.

Figure 5:
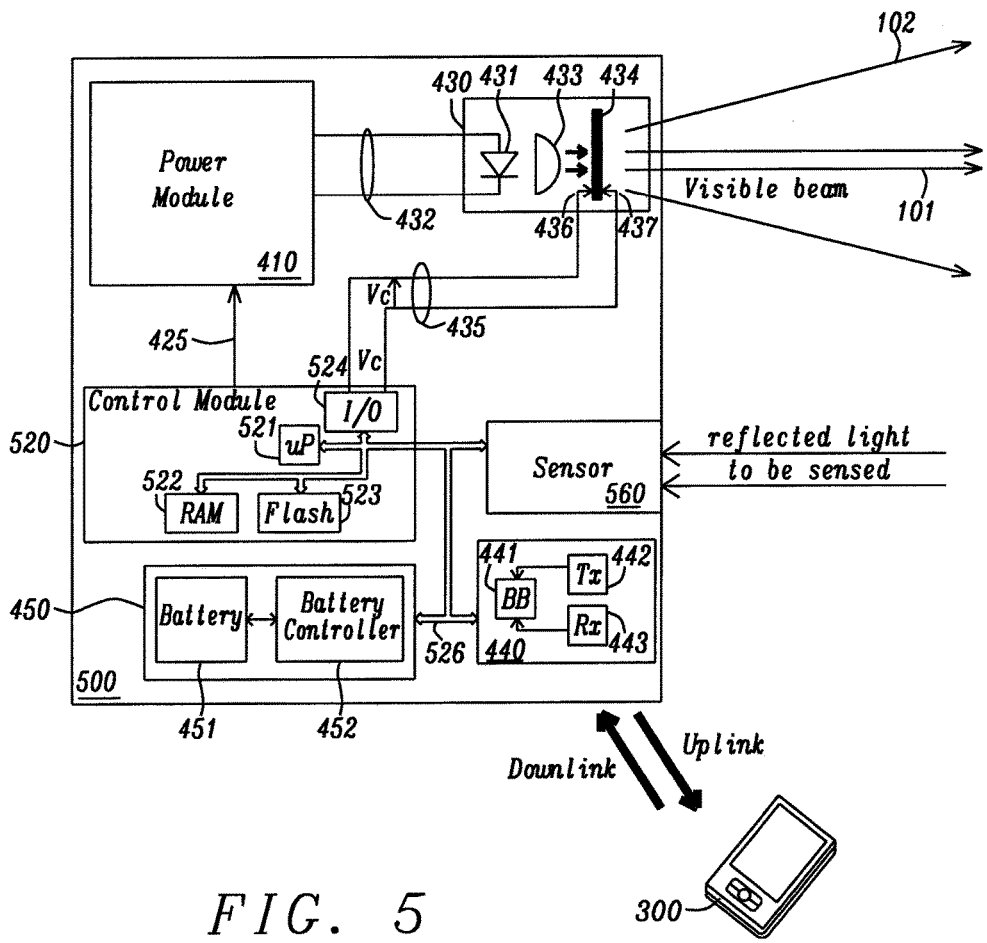
FIG. 5 illustrates a third embodiment of the present invention showing the integration of the "dynamic" or "reactive" lighting technique.

FIG. 5 shows the third embodiment in which, for brevity and simplification, it has retained the same reference to the components that remain unchanged from the second embodiment.

Headlamp 500 according to the third embodiment includes, in addition to modules 410, 430, 440 and 450 already described with respect to the second embodiment and which will not be further discussed, a control module 520 and an optical sensor 560 which is a photodiode sensor type, phototransistor, CCD operating in the visible and/or infrared, and possibly combined with its associated controller. The optical sensor 560 measures the ambient brightness optionally combined with the illumination received after reflection on obstacles close to the light beam emitted by the LED and emits an output current as a function of the illumination to which it is subjected. The output current is substantially a linear function of the sensed illumination in lux. For more information on the optical sensor, reference is made to the patent application WO2009/133309 of the applicant already mentioned above.

For its part, control module 520 includes a processor 521 associated with some volatile memory (RAM) 522, and non-volatile memory (FLASH, ROM) 523 as well as input/output I/O module 524 which communicate via an address bus, data bus and control bus 526 with the different modules present in the lamp, including the sensor 560, but also the module transmitter/receiver 440 and the battery module 450 already described in connection with the second embodiment.

With this arrangement, control module 520 may have access to information sensed by the sensor 560 and deriving information representative of the light reflected on one illuminated object.

This information is of great utility in a "stand alone" operation of the lighting called "reactive" or "dynamic" because it allows control module 520, via control algorithms more or less sophisticated which will not be described here to set and adjust not only the brightness of the light emission (via the information or control signal transmitted on the lead 425) but also the diffusion angle to be applied and defined by the bias voltage Vc (generated by the I/O module 524) to be applied to the DPLC film 434.

As seen in the figure, the third embodiment is quite suitable for the implementation of the so-called "dynamic" or "reactive" lighting, which has shown a great interest in the public since it not only reduces the power consumption of the lamp—by limiting the power consumption to the minimum required for lighting when the illuminated object is close to sensor 560—but also increases the user comfort by avoiding glare situation (eg by controlling the light beam so as to generate a short and wide beam with limited power when the lamp holder is facing another user).

Beyond these benefits resulting from the "dynamic" lighting, the third embodiment which is illustrated in FIG. 5 also allows to substitute, to add or to combine the existing internal control loop, a possibility of additional feedback control—with a higher level of efficiency—which is under control of mobile device 300.

Indeed, as for the first two embodiments, control module 520 can advantageously use the presence of the two uplink and downlink communication channels established with the mobile device 300 to transmit to the latter, on the uplink channel, all information which is representative of operating of the headlamp, including the brightness of the generated beam, the angle of diffusion to be applied, but also any parameter characteristic of the internal control loop already used.

Conversely, the downlink channel can now be configured for exchanging not only setting values for the brightness of the beam and/or the diffusion angle, but also all other parameters which may be adjusted as required for a fine control of the "dynamic" lighting control process, and in particular for simultaneously adjusting the power of the light and the angle of diffusion applied by diffusion control device 34 through an adjustment of voltage Vc.

Thus, various embodiments are possible. Either the external control loop implemented in the device 300 will be substituted in the internal control loop, or it will complement to enrich and refine the internal control loop already present.

In this way, the DPLC film becomes completely transparent when a high voltage V is applied, causing no dispersion of the light beam or, conversely, diffuse when no voltage is applied, then dispersing the light beam in all directions. Thanks to such control, one may achieve either a quite narrow focused beam or, conversely, a diffused beam. As for the second embodiment, one will preferably use a LED fitted with a narrow beam, producing a light beam being the narrowest possible in combination with such a film DPLC.

As seen in the figure, it is the I/O module 524 which allows the generation of the bias voltage Vc. Or, if this is appropriate, the specific DPLC controller (not shown in the figure) controlled by module 524 can be used for generating the desired control voltage Vc. The electronic circuits for the realization of such a controller, in particular based on the type of voltage converters "boost" are well known to one skilled in the art and will not be specifically described. Simply specify that the DPLC controller is both connected to the device 434 (DPLC film) and the processor 521 via the module 524. The DPLC controller receives an instruction from the processor 521, and applies the corresponding voltage across the DPLC layer or film of the device 434. In a particular embodiment, the DPLC controller is also able to respond to a request issued by the processor 521 and transmit in response the current value of the voltage across the DPLC film device 434.

Thus, it can be seen that information handling system of mobile device 300 can control (ie read values or send commands for setting new values) to all modules housed within the lamp, can send read requests or commands that will interpreted by the processor 521 and converted into control signals to be forwarded to the appropriate module.

The structural elements of the third embodiment having been described in relation to FIG. 5, it is now possible to develop more specifically the benefits of such an embodiment, particularly in terms of new functionalities:

To this end, it is useful first to summarize the different parameters which can be controlled by the information handling system of mobile device 300 as well as the messages related to each parameter in both uplink or downlink:

| Parameter | Uplink | Downlink |
| --- | --- | --- |
| State of charge of the battery | Value representative of the State of Charge transmitted | Request for reading the State of Charge |
| Brightness of the light | Value representative of the measured light transmitted | Request for reading the light measurement |
| Light power | Value representative of the power of the light transmitted | Request for controlling the power of the light Request for reading the power of the light |
| Diffusion coefficient | Value representative of the coefficient of diffusion | request for controlling the coefficient of diffusion Request for reading the coefficient of diffusion |

Second Usage Scenario:

There will now be described more specifically an embodiment of the lamp operation in "dynamic" mode or "reactive" as disclosed in the patent application WO2009/133309 of the applicant, to highlight how the performance and efficiency of the lamp can be significant improved.

Comprehensively the headlamp will adjust, thanks to the information handling system of the mobile device, both the light power and the diffusion coefficient of the DPLC layer in response to measurements performed by the optical sensor.

The dedicated application running inside the information handling system of the mobile device 300 will therefore receive on the uplink, either periodically at the initiative of the lamp or upon request, the values representative of the measured brightness and will transmit on the downlink channels appropriate commands for controlling and adjusting the light power and the diffusion coefficient.

This remote control functionality from the dedicated application offers many advantages, particularly in terms of the complexity of implementing algorithms, flexibility of operation. First, the dedicated application can selectively obtain a value of the ambient light as well as the brightness caused by the reflection of light prior to initiating any control of the light brightness and the diffusion coefficient.

To obtain the value of the ambient light, the dedicated application sends, through the mobile information handling system, a first lamp switch-off command (zero light output) followed almost simultaneously by a brightness read command. We can of course replace these two control emissions by a specific command ambient light reading as the processor 521 of the lamp will interpret as a sequential list of actions to achieve:

1) switch off the LED 431
2) measuring the brightness by means of sensor 560
3) restablishing the power of the LED to its value before the switching-off and
4) transmitting on the uplink channel the value of the brightness measured by the sensor.

Having subsequently obtained a brightness value without switching-off the lamp by means of a simple read command, the dedicated application can then compare the two values so as to derive an estimation of the value of induced light reflection and thus an indication of illuminated objects.

By those two brightness values as input data, the dedicated application is able to determine both the light power and the proper diffusion coefficient to use.

The dedicated application can also use additional auxiliary data such as mode (jogging mode, caving fashion . . . ) and GPS data.

A typical example is the case where the headlamp illuminates at a short distance the face of another person. In such situation, the dedicated application measures a high value of light reflexion because of the short distance (Lamp light reflected by the face) and, in response, will control the lamp so as to significantly reduce the brightness of the light while increasing the diffusion coefficient applied by the controllable DPLC diffusion device in order to broaden the beam.

If, against no light reflection is measured, it will be wise to increase the diffusion coefficient of light or also reduce the light output.

It is also clear that depending on the mode of use being considered, the headlamp is configured to behave differently: So in jog mode, the risk of mutual glare are low, so it will be appropriate to increase the reaction time of the lamp. Conversely, the ambient brightness is subject to great variations (city traffic, jog under trees . . . ) and should therefore be measured more regularly. GPS data will also help prevent changes in circumstances (town passing countryside . . . ) and could advantageously serve to broaden the light beam when the lamp holder approaches a bifurcation which calls his/her attention so as to avoid any error of trip.

In a particular embodiment, the lamp also incorporates an electronic compass that will allow the transmission, on the uplink channel, information corresponding to the direction where the lamp user is looking. The mobile device receives this information and, in combination with the GPS data and the preprogrammed route diagram, can transmit appropriate control information via the downlink channel to permit generation of a suitable alarm signal, particularly when the lamp user reaches a bifurcation and might apparently be looking toward the wrong direction. The alarm signal will be a flashing light or a significant drop in light intensity when the lamp holder inadvertently looks towards the wrong direction at the considered bifurcation. It is clear here that this is only one particular example which illustrates the great synergy resulting from the cooperation of the lamp and the mobile device mutually communicating via both uplinks and downlinks communication channels.

In the particular situation of caving mode, these ambient light changes are less frequent, and the risk of mutual glare becomes higher. The dedicated application can thus be configured to reduce the frequency of ambient light measurements and decrease the lamp reaction latency.

This shows all the enhancements and additional granularity that such embodiment can bring the operation of a "dynamic" lamp or "reactive", as originally invented by the applicant. First the ability to obtain multiple parameters, such as an ambient brightness value, together with periodic brightness values combined with GPS data, as well as the consideration of the programmed mode, may serve the application to be determine the appropriate illumination situation for the user. Finally being able to control both the light power and the diffusion coefficient of the electrically controllable DPLC diffusion device provides additional granularity to the lamp a particular situation and enriches possible lighting palette.

Complement to the First Usage Scenario:

The ambient light measurements (Lamp off) and current measurement (lamp on) that were described above can of course enrich all other operating scenarios such as the particular guaranteed autonomy functionality mentioned above.

Thus the measurement of ambient light can be used to calculate, in addition to the parameters already mentioned in the first scenario, a light power reference to respect (as either average power or as maximum power).

The current brightness measurements (ie when the lamp is on) are then used to complete the operation in "dynamic" mode or "reactive" mode of the headlamp by adjusting the power of the light according to the reference value.

Third Usage Scenario:

In this third scenario, we will present a method taking advantage of the mutual communication between the lamp and the mobile information handling system to generate an alert situation, including emergency or on detection of an incident.

The accident risk is indeed increased in a situation of low light conditions and when an accident occurs, then it becomes essential to localize the person which needs help.

We will now describe how the lamp and the mobile information handling system may advantageously shared successive tasks.

Figure 6:
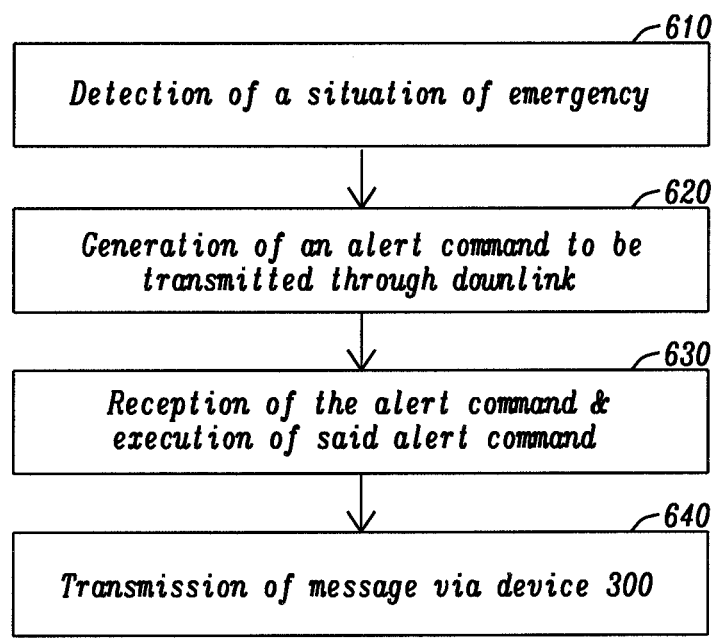
FIG. 6 shows a "reactive" lighting being improved in accordance with the third embodiment.

FIG. 6 shows a diagram for better understanding the sequence of steps performed:

The scenario begins with a step 610 corresponding to the detection, by the processing system of the mobile device, of a situation of emergency.

Such a situation may be detected from GPS data showing the immobility of the person beyond a predetermined time. It may also be initiated by the user on the dedicated application.

To avoid false alarms, the application can be configure to provide a short delay to let the user cancel the alarm procedure, by first drawing the attention of the user to the alarm procedure being initiated by the application. One possibility for drawing the user's attention is, for example, to generate a vibration on the mobile device or issue a ringtone.

After expiration of the short delay and without any reaction from the user, the process proceeds to a step 620 wherein mobile information processing system 300 will generate an alert command to the headlamp on the downlink communication channel. This alert command will contain an emergency lighting control for the headlamp, and particularly a command for a specific light power and a command for a diffusion coefficient, respectively for the power module 410 and the device 434. It may further contain a flash frequency value to be applied.

Then, in a step 630, the alert command is received by the lamp. Once detected by the transceiver module the command is interpreted by the processor 521 of the lamp 500, and the various parameters in this command are applied to the respective modules.

Thus the lamp will flash at the frequency indicated while applying light power and the diffusion coefficient that has been prescribed by the mobile processor in communication with the headlamp. The establishment of an ARQ type of repeater protocol mentioned above may lead to the repetition of step 620 if no ACK acknowledgment is received after a certain time, or if a non-acknowledgment NACK is received by the mobile information processing system from the headlamp.

In a step 640, which may either be before, after or simultaneously with steps 620 and 630, an alert SMS and/or a warning call containing GPS data if available may be issued by the mobile information handling system.

The process described in FIG. 6 can be used in various applications. This is particularly the case when step 610 results from the detection of an incident within a trip, as when the GPS data collected by the device 300 show that the lamp holder wanders away from a itinerary predefined in advance.

In this case, step 620 will then be used for generating an alert command on the downlink communication channel, which is then received by the control module 520 in order to generate a warning flashing, with a given frequency so as to inform the lamp holder that he is mistaken his/her route or is about to get lost . . .

These two examples show the great interest that one can find to the relocation of the lamp operating parameters (power, diffusion angle) within the mobile device 300.

But even more powerful functionalities become possible by integrating lamps within a collective group of lamp constituting a genuine network of lamps, as we will now see with a fourth embodiment. 4

4) Fourth Embodiment: The Headlamps Network

Figure 7:
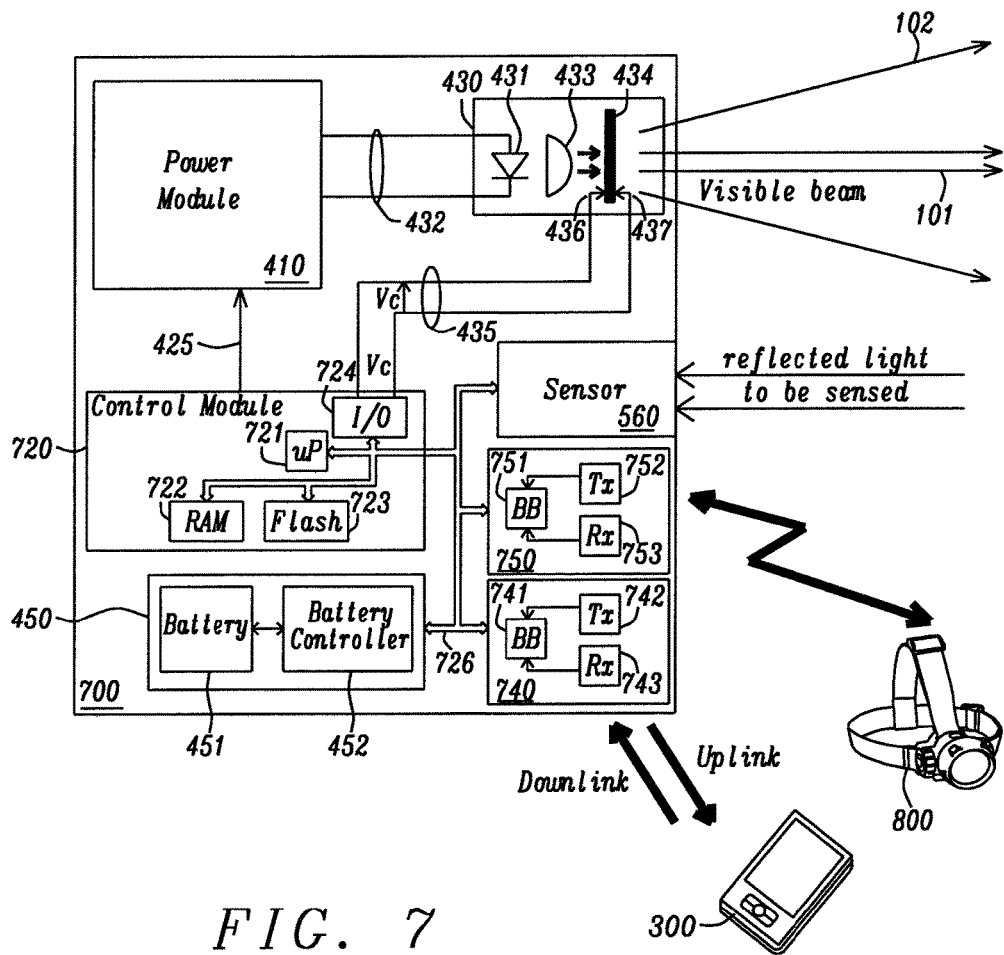
FIG. 7 illustrates a fourth embodiment providing communication means allowing communication with a mobile device 300 as well as other lamps belonging to a same group of lamps.

This fourth embodiment shown in FIG. 7 is based on the use of the communication facilities which are provided by the bi-directional communication means available in the lamp.

Indeed it has been discovered that the lamp may gain functionality not only by communicating with its counterpart mobile device but also by communicating within a larger network of the type ad-hoc that can include multiple lamps (lamp 800 is illustrated in FIG. 7) and a number of associated information handling systems.

The fourth mode is shown in FIG. 7 which shows a head lamp 700 which includes—besides the modules 410, 430, 450 and 560 already described in connection with the third embodiment (and the elements keep their reference numerals)—a first transmitter-receiver module 750 comprising a baseband module 751, a transmitting module 752 and a receiving module 753 preferably operating under IEEE 802.11, one sub-component is known as Wireless LAN. This standard supports the establishment of an ad-hoc communication network.

In a particular embodiment, the headlamp include a second transceiver module 740 including a baseband module 741, a transmitting module 742 and a receiving module 743 operating under the Bluetooth standard and preferably the Bluetooth standard 4.0 low energy. This second transceiver module 740 in Bluetooth will be dedicated to communication between the headlamp and the dedicated mobile information handling system, while the first module under W-LAN serves for communications between headlamps and the mobile information handling systems present in the established ad hoc network. Besides these two transceiver modules 740 and 750, the lamp 700 further includes a control module 720 having a processor 721 with its volatile RAM 722 and non-volatile 723 and associated input/output I/O circuits, which is capable of interfacing all existing modules in the fourth embodiment, particularly both transceiver modules 740 and 750 so as to, first, read the settings parameters and information stored in those modules and also, secondly, write setting parameters and information for controlling the operating of those modules under control of external mobile device 300.

One may thus advantageously achieve a lamp which is capable to communicate not only with the mobile device 300—and thus benefit from the processing resources available in the latter—but also with other lamps of the same type as the lamp 800 so as to constitute a collective network of lamps which may share the information and resources available.

Thus, the lamp 700 is no longer communicating with its dedicate mobile device 300 but is also in communication with other headlamps as the lamp 800 illustrated and other mobile information handling systems 596, 598 and 599.

The significant difference with the previous embodiments resides in the multiplicity of transmitting and receiving entities of data packets.

In an ad-hoc network, each member entity (both the headlamps and the mobile information handling systems) receives a network identifier. Each packet transmitted on the network contains a header with both the identification of the issuing entity and the destination entity of the message.

We can provide group identifiers to achieve multicast communication or broadcast communication where an emitting entity transmits to several receiving entities. Processor 721 will therefore initially identify, for each packet detected, the sending entity of the packet and the destination entity of the packet. If the package is not intended for it, processor 721 will re-transmit this packet, ie by relaying it. The lamp then acts transmission relay. One sees that, thanks to this method of re-emission and re-routing of the packets, the ad-hoc network can be extended, which can cover a lamp holders procession. If the packet is actually intended for it, the processor 721 will then, as has been seen above, interpret the message in it and execute it. To avoid conflicts between emitting entities, the lamp will always consider as a priority, in a specific embodiment, the messages issued by its dedicated mobile device. Among all other lamps and other mobile processing devices, a mobile information handling system may in some scenarios be configured as the master node of the ad-hoc network and commands sent by the master node supplant all other commands received.

The dedicated application 350 running in the mobile information handling system 300 dedicated to the headlamp 700 has an ad-hoc network configuration functionality between all lamps and all other mobile information handling systems. Each network entity receives its network ID and group IDs can be created.

To illustrate the flexibility of this embodiment, we will describe more precisely examples of new functionalities enabled by this new embodiment.

Fourth Usage Scenario:

The fourth scenario relates to a lighting control according to a distance measured between two network entities.

Taking a concrete example of a night walk with several participants who follow one behind the other, we see that each lamp will be configured with different lighting parameters depending on the position of the holder within the full procession. In particular, the lamp being in front of the processing will have to be configured to generate a more powerful light to illuminate a dark area in front of it, whereas each lamp behind it will only illuminate the space between it and the lamp before it.

It therefore appears appropriate to fit each lamp with computation means for calculating the distance between two lamps in order to regulate the light output depending on the distance.

Figure 8:
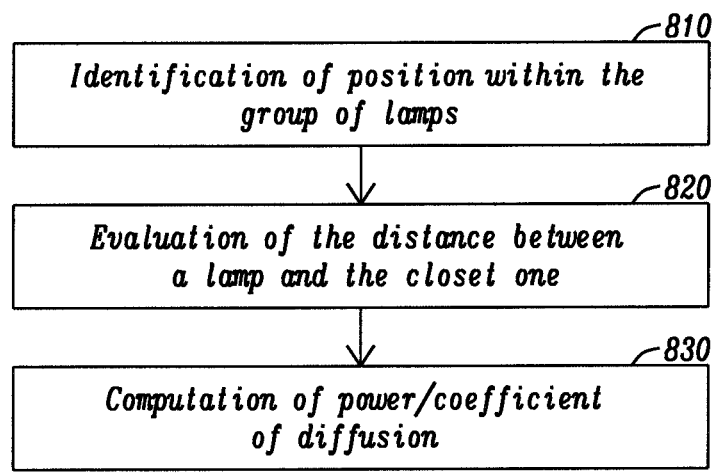
FIG. 8 illustrates a diagram of a scenario which is useful for adjusting the power of the light generated by a lamp belonging to a group of lamps being organized in a network of lamps.

FIG. 8 more particularly illustrate the different steps to be considered.

The method begins with a step 810 corresponding to the determination of the location or position. In a first case, the position of each of the lamps is predetermined in advance, and every lamp knows whether another lamp is before within the procession and particularly knows the network identifier.

In a second case, the dedicated application gets this relative position by exchanging GPS data between different mobile information handling systems.

If the headlamp, at the end of this step, appears to be in the first position within the procession, ie has no head lamp in front of him, such headlamp is configured to be operated in accordance with the second scenario mentioned above (in dynamic mode operation evolved using internal and external loops regulation)

If, against the lamp is recognized as having another headlamp preceeding it within the procession—the lamp knows the identifier at the end of this first step—and the proceeds to a step 820, wherein the process continuously determines the distance separating these two lamps. This distance measurement can be done either by exchanging GPS data between the mobile information handling systems dedicated to these two lamps but this proves to be a complex calculation method or you may use a easiest method to determine the level of the received power, known as the Received Signal Strength Indicator (RSSI) on the packages regularly transmitted to this effect by each lamp. Thus our lamp 700 knows, at the end of step 810, the identifier of the lamp in front of it. It will therefore detect packets sent by this lamp and can measure on each packet received power (RSSI). Depending on the measured RSSI and knowledge of the transmission power (the same assumed for each lamp), the attenuation due to the propagation can be determined.

This attenuation then allows an estimate of the propagation distance and thus the distance between the two lamps. This step can be conducted optionally in the lamp or in the mobile information processing system that may very advantageously to provide its computing power for this purpose.

Then the method continues with a step 830, during which either the lamp processor or the dedicated application on the mobile information processing system will calculate a light output and a suitable diffusion coefficient and, where appropriate transmit corresponding commands on the downlink of the lamp considered.

Thus after this step 830, the light power and the lamp diffusion coefficient are adjusted taking into account the distance between the two lamps, or any other appropriate parameter.

As shown, thus coming to thereby maximize both the lighting of each lamp while conserving power and hence battery of each of the lamps.

Complement the First Three Use Cases:

A particularly remarkable corollary to the third scenario which was described above, results from the possibility of achieving the concept or effect of guaranteed group autonomy.

Thus, thanks to these multiple communications within the headlamps network, under control or not by the associated mobile devices, it become possible not only to guarantee the autonomy of one single headlamp but also the autonomy of a full group of lamps. One thus wants to ensure that a value for x hours of autonomy guaranteed, no lamp belonging to the network of lamps might fall in a critical situation in terms of the battery charge.

This scenario is similar to the first scenario but it is now coordinating all the lamps.

In this more sophisticated scenario, two additional parameters are taken into account: the arrangement of the lamps and the distance between lamps. To save battery of the headlamp being at the head of the procession, it will be wise to issue commands to switch the order of the lamps so that each lamp goes to head of the procession. So based on all the parameters of the first scenario and also on the relative position of the lamps and the distance between each lamp as calculated in the fourth scenario, each dedicated application or a single so-called master dedicated application will calculate the light output to provide the diffusion coefficient and the possible permutation of the order of each of the lamps and transmit these commands to each of the lamps.

The second scenario of the "dynamic" or "reactive" mode can also be enriched by this network arrangement by judiciously combining the second and fourth scenario above.

Thus, the control of the light power and the calculated diffusion coefficient which are transmitted on the downlink channel may be determined as a function of an additional parameter being the estimated distance between the two lamps. So based on the estimated distance between the two lamps, ambient light and periodic brightness values combined with GPS data and the programmed mode, the application has multiple input parameters that will allow it to better determine the appropriate illumination situation for the user.

The third emergency scenario can also be enriched by these network arrangement. So we come here modify step 402 described above or the control message sent by the mobile information handling system will be broadcasted to all lamps and not just one dedicated lamp. So all the network entities will be informed of the emergency of one of their members and can take into consideration the situation of emergency and react accordingly, especially as GPS coordinates of the member in emergency can be communicated to them. As it can be seen, the application possibilities are many, and one can evoke, as examples and possibilities, the following application areas:

Management
  management of a lighting equipment or lamp park fleet (communities, guides, charters, . . . )
  energy management (power adjustment to the course—guaranteed autonomy—sharing and distribution of energy in the fleet)
Health:
Physical conditions;
Performance;
Physiological information
Coach, trainer,
Heart rate, stress management
Emergency call . . . .
Events and Competitions
Network lamps;
Race starts
Detecting the arrival
Communications between the lamps
Exchange and Sharing
social network
advice
updates
alerts
forum
Novelties—profiles
Term, good shots
Rescue Assistance Man-Machine Dialogue
Voice-activated lamp
hands free
Gestural codes
Medical applications
Photo-Video—Colors
Background music depending on terrain
Light depending on the music
rhythms
Andy Warhol
evenings
White balance, 65,536 colors
Photo-video accessories—Flash
And also some additional various functions:
Wake lamp (dawn simulator, bright atmosphere, yoga relaxation, helps sleep onset)
GPS lamp (tracer localization, training courses, guidance, geo-catching, geolocation)
Lamp weather station (wind speed, humidity, climate change)

These different fields of application certainly does not exhausting all the possibilities offered by the invention.

What is claimed is:

1. A portable lamp comprising
a light source for generating at least one light beam;
a control module for controlling a brightness and a geometry of said light beam;
a battery for supplying said light source;
a light sensor for measuring the brightness of said light source;
first bidirectional wireless communication circuits for exchanging commands, parameters and/or configuration data with at least one mobile information handling system, comprising:
  a receiving unit for establishing a downlink communication channel for transmitting said commands, parameters and/or configuration data to the lamp;
  a transmitting unit for establishing an uplink communication channel for the transmission of commands, parameters and/or lamp configuration data to said mobile information handling system
wherein the uplink communication channel is configured to receive values representative of measured brightness, the mobile information handling system is configured to determine a brightness and a proper diffusion coefficient to use, and the downlink communication channel is configured to transmit commands for controlling and adjusting the brightness and the diffusion coefficient.

2. The portable lamp according to claim 1, wherein said receiving and transmitting circuits are configured for establishing a communication with at least one other lamp located in a local neighborhood.

3. The portable lamp according to claim 2, wherein said communication circuits are configured for establishing an ad-hoc network wherein each of the lamps and or the mobile systems receive an identifier.

4. The portable lamp according to claim 3, wherein said ad-hoc network uses group addresses for simultaneously addressing several lamps and/or mobile information handling systems belonging to a same group.

5. The portable lamp according to claim 4 wherein said uplink transmissions and/or downlink transmission are intended for all devices of a same group.

6. The portable lamp according to claim 4 wherein the group addresses are used for the transmission of a group command generated by said mobile system and transmitted to all lamps of said group.

7. The portable lamp according to claim 1 wherein it comprises means for detecting the state of charge of the battery, said state of charge being transmitted to said mobile system via the uplink communication channel.

8. The portable lamp according to claim 1 wherein it comprises a sensor for sensing the light, said information being transmitted to said mobile system via the uplink communication channel.

9. The portable lamp according to claim 8 wherein said sensor operates in the visible range and/or infra-red.

10. The portable lamp according to claim 1 wherein the uplink communication channel is used to transmit a information representative of the power and/or an information representative of the geometry of the beam.

11. The portable lamp according to claim 1 wherein the lamp comprises an electrically controlled diffusion device controlled by said second information received from the mobile system.

12. The portable lamp according to claim 1, wherein said first and second information are dependent on the distance between the lamp and a lamp located in a neighborhood, said distance being determined by means of an estimate of the RSSI of the received signal of this neighboring lamp.

13. The portable lamp according to claim 1, wherein the first bi-directional communication is based on a Bluetooth or WiFi communication.

14. The portable lamp according to claim 1, wherein said portable lamp is a headlamp having one or more LED diodes.

15. A method of controlling the operation of a portable lamp having a light source for generating at least one light beam, control means for controlling luminosity and a geometry of said light beam, and a battery for supplying said light source, said method comprising the steps of:
establishing a bidirectional and wireless communication between the lamp and a mobile information handling system, comprising a downlink communication channel to the lamp and an uplink communication channel to said mobile information handling system;
said downlink communication channel is used for the transmission of said commands and/or configuration data to the lamp; and said uplink communication channel is used for the transmission of the lamp operating parameters to said mobile processing system information
wherein the uplink communication channel receives values representative of measured brightness, the mobile information handling system determines a brightness and a proper diffusion coefficient to use, and the downlink communication channel is configured to transmit commands for controlling and adjusting the brightness and the diffusion coefficient.

16. The method according to claim 15 wherein it comprises the steps of:
detecting the state of charge of the lamp's battery charge status;
transmitting said state of charge of the battery to the mobile information handling system.

17. The method according to claim 15, wherein it comprises the steps of:
detecting the brightness facing the lamp by means of a photosensor;

transmitting to said mobile information handling system an information representative of said brightness sensed by the photosensor.

18. The method according to claim 17, wherein said mobile information handling system uses the brightness information supplied by the lamp for generating said first and second information.

19. The method according to claim 15 wherein the lamp brightness is controlled by a first information received from said mobile information handling system via the downlink communication channel.

20. The method according to claim 15 wherein the geometry of the beam generated by the lamp is controlled by a second information received from said mobile information handling system via the downlink communication channel.

21. A method according to claim 15 wherein the bidirectional communication is organized according to an ad-hoc network wherein each of the lamps and the or mobile information handling systems receive an identifier, said ad-hoc network using group addresses to simultaneously address multiple lamps belonging to a same group.

22. The method according to claim 21 wherein said mobile system receives the state of charge of the battery provided by each lamp of said group and generates said first information for each lamp of said group in accordance with said states of charge so as to ensure a predefined lifetime for the whole group of lamps.

23. The method according to claim 15 wherein said mobile information handling system uses the state of charge of the battery supplied by the lamp and generates said first information according to said state of charge so as to ensure a predetermined lifetime for the lamp.

24. The method according to claim 15 wherein said mobile system detects an emergency situation and transmits on the downlink communication channel to the lamp an alert control controlling the generation of an alarm light signal.

25. The method according to claim 24, wherein the emergency situation results from the GPS data used to determine a bifurcation where the lamp holder may departs from a predetermined path or get lost.

26. A programming code comprising a computer program intended to be stored in said mobile information handling system, said program being adapted to implement the methods steps of claim 15.

27. A mobile processing system wherein it is adapted to the implementation of the or of the methods defined in claim 15.

* * * * *